(12) United States Patent
Robicheau et al.

(10) Patent No.: US 6,663,054 B2
(45) Date of Patent: Dec. 16, 2003

(54) COMBINED SAFETY CLIP AND CLOSURE FOR A CONDUCTOR SUPPORT

(75) Inventors: Richard Robicheau, Amherst, NH (US); Bruce James Ogden, Menai (AU)

(73) Assignee: FCI, Paris (FR)

( * ) Notice: Subject to any disclaimer, the term of this patent is extended or adjusted under 35 U.S.C. 154(b) by 0 days.

(21) Appl. No.: 10/131,783

(22) Filed: Apr. 23, 2002

(65) Prior Publication Data

US 2003/0080259 A1 May 1, 2003

(Under 37 CFR 1.47)

Related U.S. Application Data

(63) Continuation-in-part of application No. 10/033,106, filed on Oct. 26, 2001.

(51) Int. Cl.[7] .............................. E21F 17/02; F16L 3/00
(52) U.S. Cl. ......................... 248/58; 248/68.1; 248/49
(58) Field of Search ........................ 248/68.1, 58, 49, 248/67.7, 62, 72; 174/101, 68.3, 97

(56) References Cited

U.S. PATENT DOCUMENTS

| | | | |
|---|---|---|---|
| 4,131,257 A | 12/1978 | Sterling | 248/67.5 |
| 4,347,998 A | 9/1982 | Loree | 248/68 R |
| 4,840,333 A | 6/1989 | Nakayama | 348/68.1 |
| 5,188,319 A | 2/1993 | Hawash et al. | 248/68.1 |
| 5,323,988 A | 6/1994 | Handler | 248/49 |
| 5,535,969 A | 7/1996 | Duffy, Jr. | 248/68.1 |
| 5,564,658 A | 10/1996 | Rinderer | 248/58 |
| 5,730,400 A | * 3/1998 | Rinderer | 248/68.1 |
| 5,779,198 A | 7/1998 | Rutherford et al. | 248/58 |
| 5,816,542 A | 10/1998 | Rinderer | 248/58 |
| 5,992,802 A | 11/1999 | Campbell | 248/68.1 |

FOREIGN PATENT DOCUMENTS

| | | |
|---|---|---|
| AU | 199943515 | 3/2000 |
| FR | 2697690 | 5/1994 |
| JP | 55-12013 | 1/1980 |
| JP | 55-14923 | 2/1980 |
| JP | 55-69312 | 5/1980 |
| JP | 61-135011 | 6/1986 |
| JP | 2000-152458 | 5/2000 |
| WO | WO 98/24160 | 6/1998 |

OTHER PUBLICATIONS

Patent Abstracts of Japan, 2000–152458, one page, May 30, 2000.
Patent Abstracts of Japan, 2001–078326, one page, Mar. 23, 2001.
DataQik Pamphlet, FCI Burndy Products, 8 pages, 2001.

* cited by examiner

Primary Examiner—Gwendolyn Baxter
(74) Attorney, Agent, or Firm—Harrington & Smith, LLP

(57) ABSTRACT

A combined safety clip and closure device for a conductor support. The combined safety clip and closure device includes a first restraining section and at least one closure section. The first restraining section is adapted to be located at, and restrain movement of, at least one spring clip deflectable tongue of the conductor support. The spring clip is mountable to a spine of the conductor support. The closure section extends from the first restraining section. The closure section extends outward from the first restraining section a majority of its length.

21 Claims, 11 Drawing Sheets

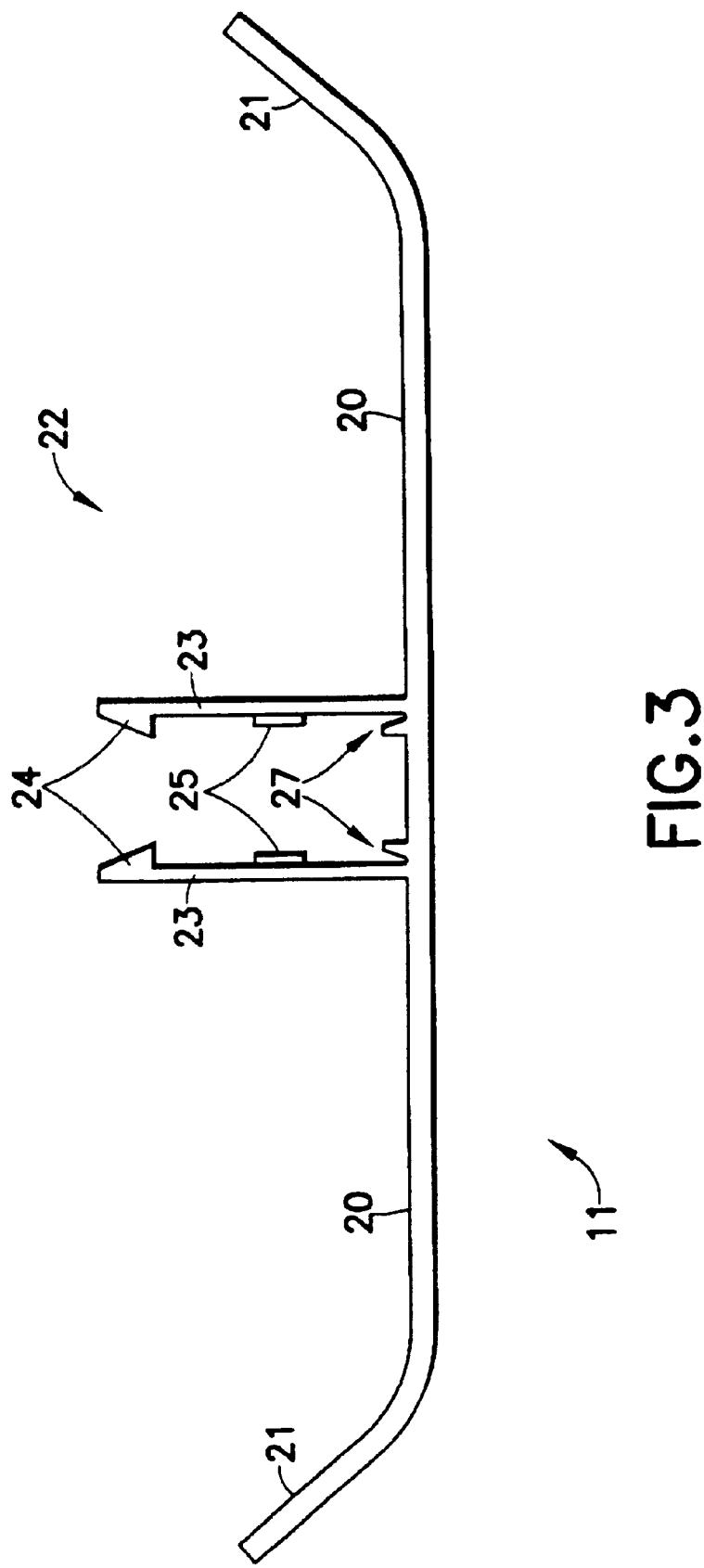

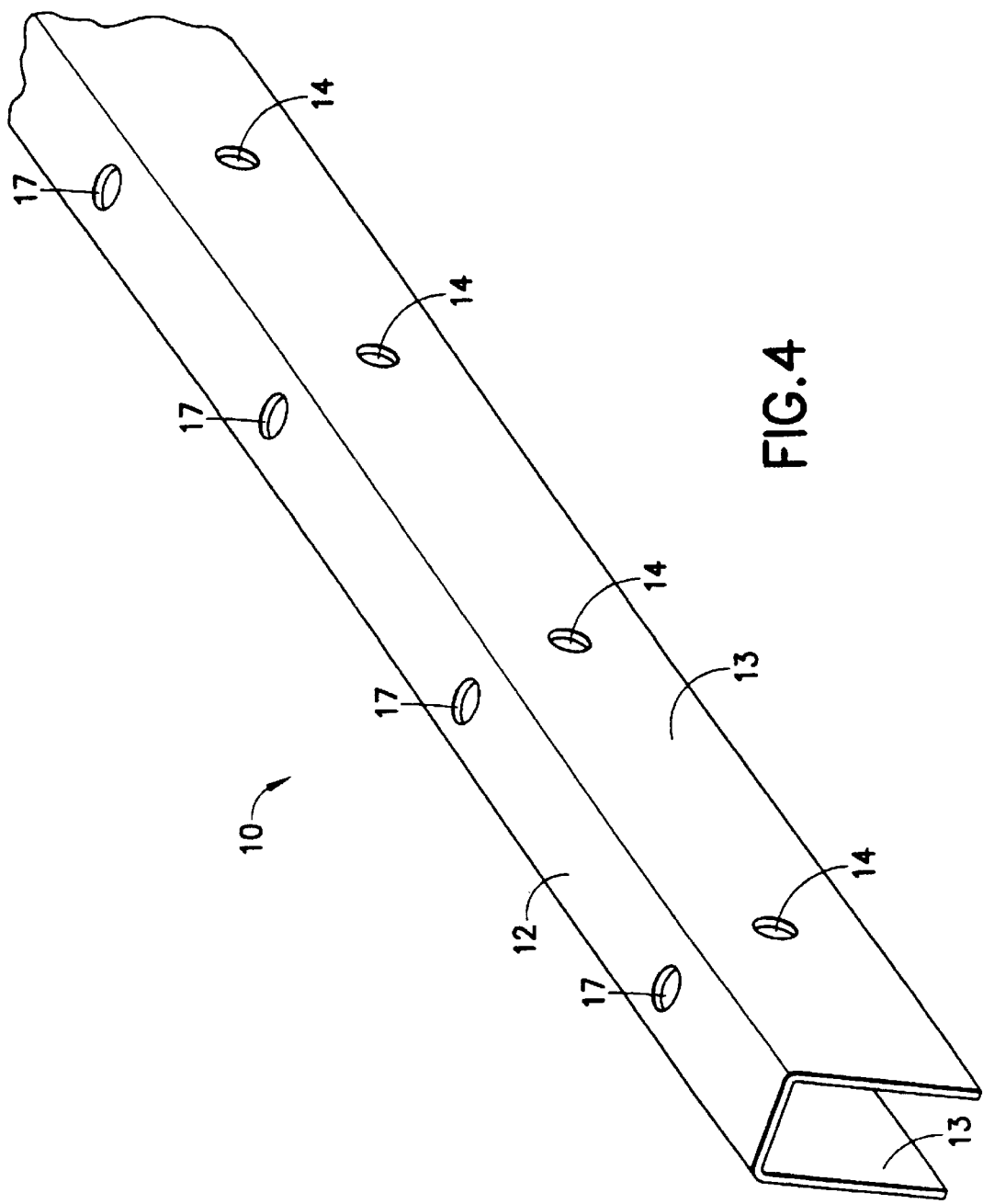

COMBINED SAFETY CLIP AND CLOSURE FOR A CONDUCTOR SUPPORT

CROSS REFERENCE TO RELATED APPLICATION

This is a continuation-in-part patent application of U.S. patent application Ser. No. 10/033,106 filed Oct. 26, 2001 which is hereby incorporated by reference in its entirety.

BACKGROUND OF THE INVENTION

1. Field of the Invention

The present invention relates to a supporting system for supporting elongate conductors and, more particularly, to a device for containing the conductors in a bearer element of the supporting system.

2. Brief Description of Prior Developments

This invention relates to supporting means for elongated building services supply means. Service supply means may be low voltage electric power cables (for example, such as cables rated for 50 Volts or less), communication cables, water or gas pipes or other elongated conductors for the supply or distribution of services within a building. Such supporting means necessarily include one or more bearer elements on which the service supply means rest. Typically the bearer element has been the floor of a tray or trough fixedly associated with the building being serviced, for example carried by wall brackets or suspended from a ceiling or other overhead building component by tie rods or the like. Probably, the most frequently occurring service supply means are electric cables; namely, data and signal communication transmission wires or cables. For that reason, supporting means are usually referred to in the art as "cable trays"; irrespective of the service supply means that may be supported in any instance (notwithstanding recent departures in the form of the bearer elements from that of an integral floor of a traditional tray or trough). When convenient the term "cable trays" is used accordingly hereinafter.

As stated above, traditionally the bearer elements of cable trays comprised the floor of a shallow trough or elongated tray. The service supply means resided within the trough. The trough, including its floor, was constructed from sheet material, for example steel, plastics or fibrous cement. Alternatively, at least the floor of the trough has been made of expanded metal sheet. This is preferred as it eliminates the possibility of the trough retaining water or detritus that may be damaging to the service supply means.

In other instances floor-like bearer elements came to be replaced by a plurality of spaced apart rungs extending between rigid stiles. The wall brackets or tie rods are affixed to the stiles, so that the supporting means as a whole resemble a conventional ladder in a substantially horizontal disposition. Such ladder-like supporting means are still customarily referred to as cable trays.

In more recent times, the stiles of such ladder-like cable trays have been replaced by a central spine, and the rungs by a plurality of spaced apart bearer elements extending as cantilevers from each side of the spine. The bearer elements preferably have upturned free end parts, so as to retain the service supply means. This is advantageous as the service supply means may be placed on the bearer elements from the sides, instead of having to be pulled into position from one end of the cable tray.

The last mentioned prior art is well exemplified by the published specification of Australian Patent application 99/943515 and the international publication WO 98/24160 of International application PCT/AU/00788 (both in the name of Ramset Fasteners (Aust) Pty Ltd). In that cited prior art, the spine is a rectangular sectioned tube, and the cantilever bearer elements extend through clearance openings piercing the tube walls. It is apparent that the upturned free ends of the cantilever bearer elements are formed after the elements have been passed through those openings, otherwise it would not be possible to put them in place. This is disadvantageous, as it would require expensive manual operations or the use of complex special purpose machines in the manufacture of the cited prior art cable trays.

SUMMARY OF THE INVENTION

In accordance with one aspect of the present invention, a combined safety clip and closure device is provided for a conductor support. The combined safety clip and closure device includes a first restraining section and at least one closure section. The first restraining section is adapted to be located at, and restrain movement of, at least one spring clip deflectable tongue of the conductor support. The spring clip is mountable to a spine of the conductor support. The closure section extends from the first restraining section. The closure section extends outward from the first restraining section a majority of its length.

In accordance with another aspect of the present invention, a closure device is provided for closing an entrance into a conductor bearer element for an elongate conductor. The closure device comprises a center section; and a connecting system. The connecting system comprises a main connector and at least one outer end connector with at least a portion of the center section being located therebetween. The main connector is adapted to connect to a spine mount of the bearer element. The outer end connector is adapted to adjustably connect to an outer end of a cantilevered arm of the bearer element.

In accordance with another aspect of the present invention, an elongate conductor support system is provided comprising a support frame comprising a spine; and a plurality of bearer elements connectable to the spine. Each bearer element comprising a spine mounting section and at least one cantilevered arm extending laterally outward from the spine mounting section. The cantilevered arm comprises an upturned end. The spine mounting section comprises two upwardly extending spaced tongues with an inwardly extending stud on at least one of the tongues. The stud has a slot extending upward into the stud to form a receiving area for receiving a portion of the spine therein.

In accordance with another aspect of the present invention, a safety clip is provided for a snap lock mount of a bearer element to a spine in an elongate conductor support system. The safety clip comprises a main connector section comprising two apertures for receiving top portions of snap lock tongues of the snap lock mount of the bearer element; and a snap lock peg.

The snap lock peg extends downwardly from the main connector section for directly attaching the safety clip to the spine. The snap lock peg comprising a general mushroom shape with a dome section and a stem section. The dome section is suitably sized and shaped to be press fit through a hole in the spine to snap lock mount the safety clip to the spine.

In accordance with one method of the present invention, a method of connecting an elongate conductor bearer element to a spine in an elongate conductor support system is provided comprising steps of connecting a main connection section of the bearer element to the spine; and connecting a closure device to the bearer element comprising mounting a safety clip section of the closure device to top ends of tongues of the main connection section, and covering a majority of a top side opening into a conductor receiving area of the bearer element by a portion of the closure device.

In accordance with another method of the present invention, a method is provided for connecting a closure device to a bearer element of an elongate conductor support system comprising steps of: connecting a safety clip section of the closure device to a spine mounting section of the bearer element; and adjustably connecting an outer end connector of the closure device to an upstanding end of a cantilevered leg of the bearer element. A portion of the closure device closes an opening through a top side of the bearer element into a conductor receiving area. The size of the receiving area can be varied by the adjustable connection of the outer end connector of the closure device to the upstanding end of the bearer element.

The invention is well adapted for use in relation to cable trays comprising a single spine and a plurality of discrete cantilever bearer elements, although it will be apparent to those skilled in the art that it is also applicable to ladder-like cable trays having two or more parallel spines and a plurality of discrete rung-like bearer elements.

Supporting means for elongated building service supply means can comprise at least one spine and a plurality of discrete bearer elements affixed to said at least one spine. Each bearer element can be affixed to said at least one spine by a spring clip fixedly associated with said each bearer element. For preference the spring clip is formed integrally with its associated bearer element.

The supporting means can form at least an equal plurality of locating formations on said spine, each able to be engaged by a co-acting locating formation on a said spring clip to thereafter resist disengagement of the bearer elements from the spine.

The spine can be an inverted channel section comprising a channel web and two channel flanges, said locating formations comprise a longitudinally extending row of spaced apart holes in each of the channel flanges, each spring clip comprises two upwardly directed, spaced apart resilient tongues projecting from the clip's associated bearer element, each with a barb formation at or near its free end directed towards the other, and each with a stud intermediate its ends projecting towards the other constituting said co-acting locating formations; the arrangement being such that the tongues of each clip may clasp the spine between them with the barbs of the tongues overlying respective margins of the channel web and with the studs on each tongue extending into a respective hole in the adjacent channel flange.

Furthermore, for preference, in the last mentioned embodiments each bearer element can define a groove at or near the root of each of its tongues in which a free edge margin of the adjacent channel flange is received when the barb formations overlie the margins of the channel web and the studs are homed in the holes.

BRIEF DESCRIPTION OF THE DRAWINGS

The foregoing aspects and other features of the present invention are explained in the following description, taken in connection with the accompanying drawings, wherein:

FIG. 3 a side elevation of the bearer element of FIG. 2.

FIG. 4 is a perspective view of an end portion of a spine, being a component of the supporting means of FIG. 1.

DETAILED DESCRIPTION OF THE PREFERRED EMBODIMENTS

Figure 1:
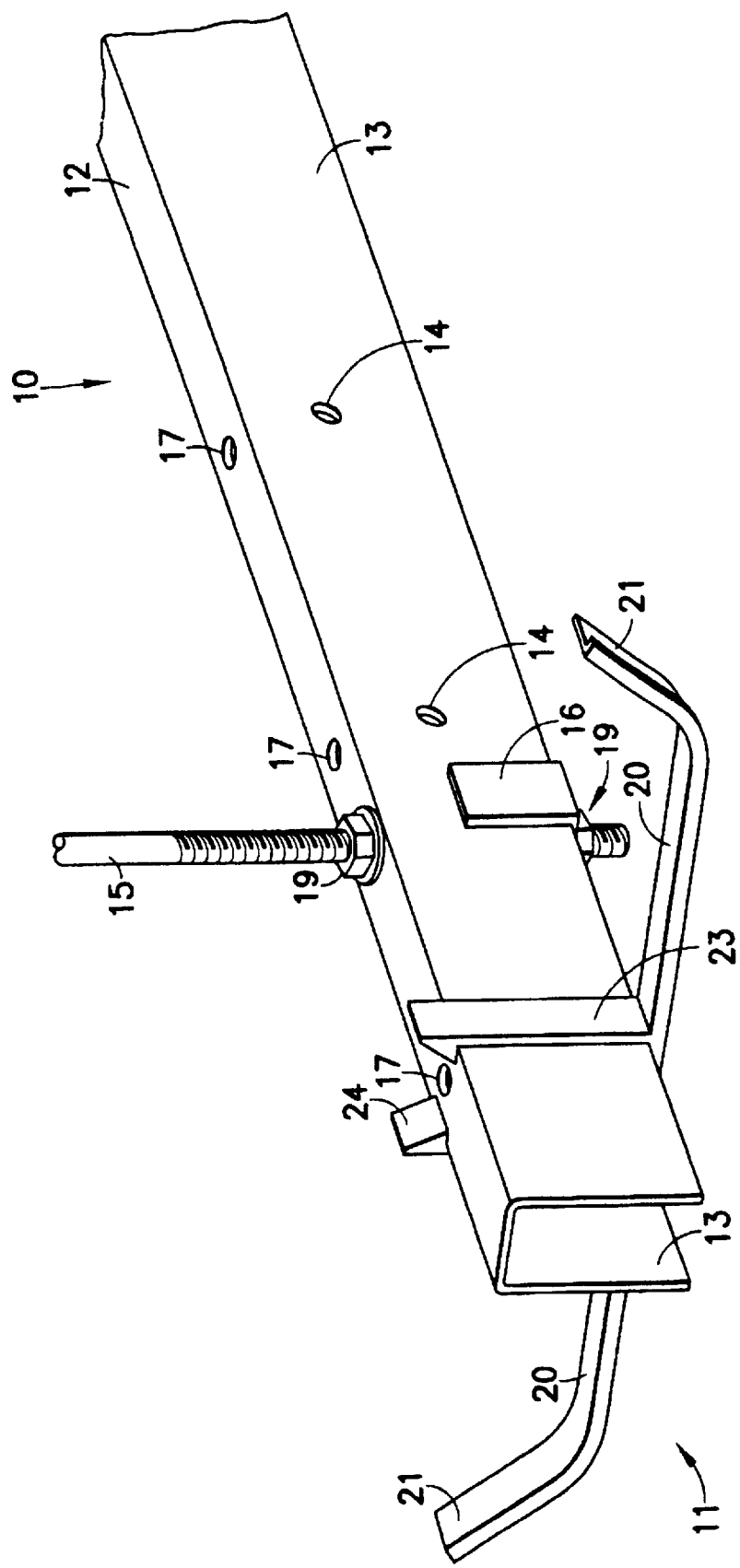
FIG. 1 is a perspective view of an end portion of a supporting means according to the invention.

The supporting means illustrated by the drawings comprises a spine 10 and a plurality of bearer elements 11 spaced along the spine 10, of which only one appears in the drawings.

Figure 7:
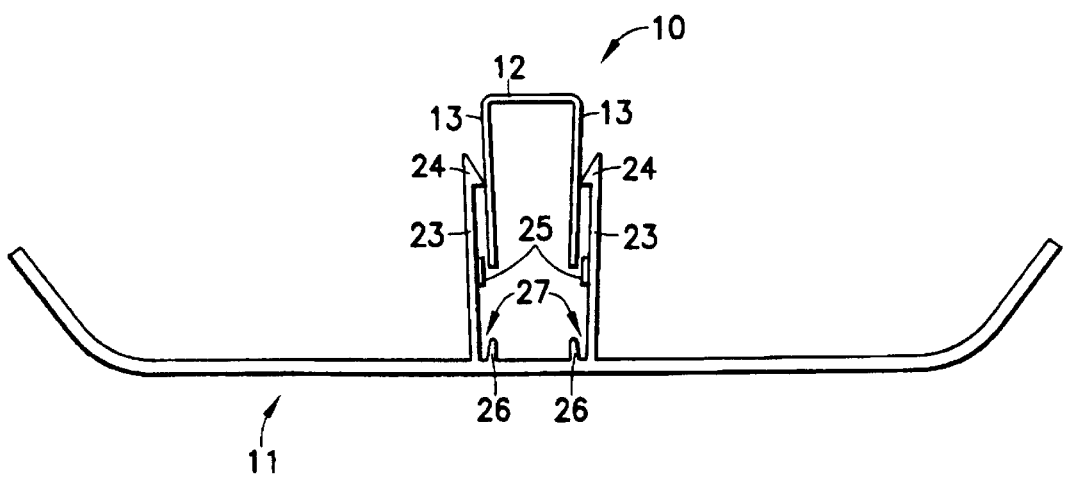
FIG. 7 is an end elevation of the spine of FIG. 4 and a side elevation of the bearer element of FIG. 2 at an early stage of their assembly into the supporting means of FIG. 1, drawn to a reduced scale.
Figure 9:
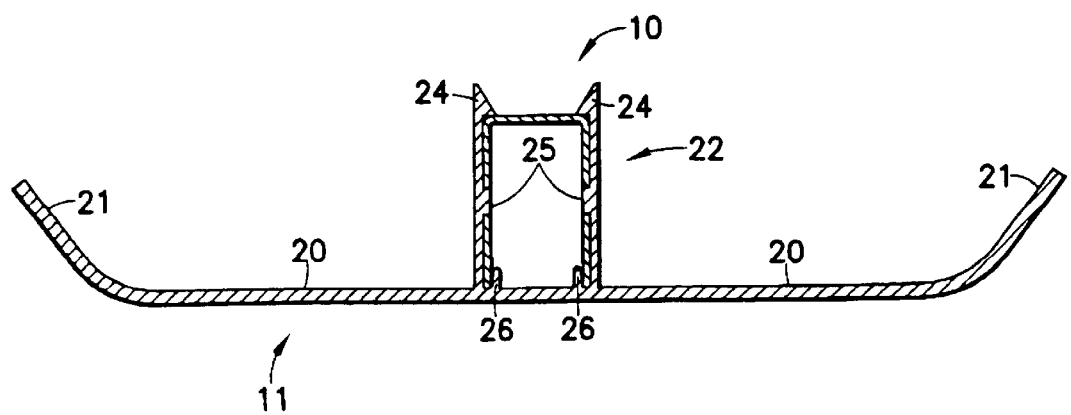
FIG. 9 is a cross-sectional elevation of the spine and bearer element of FIG. 7 at the end of the assembly.

The spine 10 is a length of inverted channel section comprising a channel web 12 and two channel flanges 13. It may be roll or press formed from sheet steel, preferably coated with a rust resistant alloy, for example an aluminum-zinc alloy. Thus, the flanges 13 possess a degree of resilience, such that their free edges may be elastically pressed towards each other to a limited extent, as shown in FIG. 7, but will return to their original position when the loading pressure is relaxed, as shown in FIG. 9.

The spine 10 is furnished with clip locating formations in the form of equally spaced apart holes 14, arranged in rows extending along the respective flanges 13.

In use, the spine 10 may be suspended by two or more threaded tie rods 15, of which only one appears in the drawings, extending downwardly from any appropriate, fixed, overhead component of the building being serviced. The spine 10 may be secured to each tie rod 15 by means of a U-shaped saddle 16 into which the spine 10 neatly sits. To that end, the channel web 12 is pierced by a plurality of clearance holes 17 and the saddle 16 is likewise pierced by a clearance hole 18. The tie rod 15 extends through a selected hole 17 and the hole 18. The saddle 16 may then be supported by a nut and washer 19 on the tie rod, bearing against the underface of the saddle 16. If desired, the affixture of the spine to the tie rod may be made more secure by a second nut and washer 19 on the tie rod, bearing against the upper face of the web 12.

As is well known, it is customary for buildings to be dimensioned having regard to a standard modular dimension. That is to say, the major dimensions of the building conform to whole numbers of the modular dimension. This enables items such as window frames, ceiling tiles, and the like, which conform to the modular dimension, to be installed without requiring to be trimmed to size. Thus, for preference, the spine 10 is provided to the user in lengths that are a whole number multiple of the modular dimension, and the centre distances between holes 17 and holes 14 are that such one or a whole number plurality of such centre distances equals the modular dimension applicable to the building being serviced.

The bearer element 11 is preferably a molded plastics item, for example of glass-filled nylon. It comprises two cantilever arms 20 with upturned ends 21 and an integral, central resilient clip 22.

The clip 22 comprises two, upwardly directed, resilient tongues 23. Each is furnished with a barb formation 24 at its free end, and a protruding stud 25 intermediate its ends. Each stud 25 is dimensioned to fit neatly into any of the holes 14.

Figure 6:
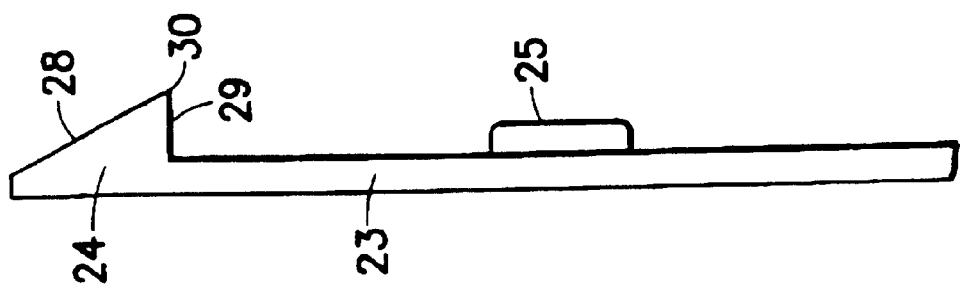
FIG. 6 is a side elevation of an upper portion of a resilient tongue, being a component of the bearer element of FIG. 2 drawn to an enlarged scale.
Figure 5:
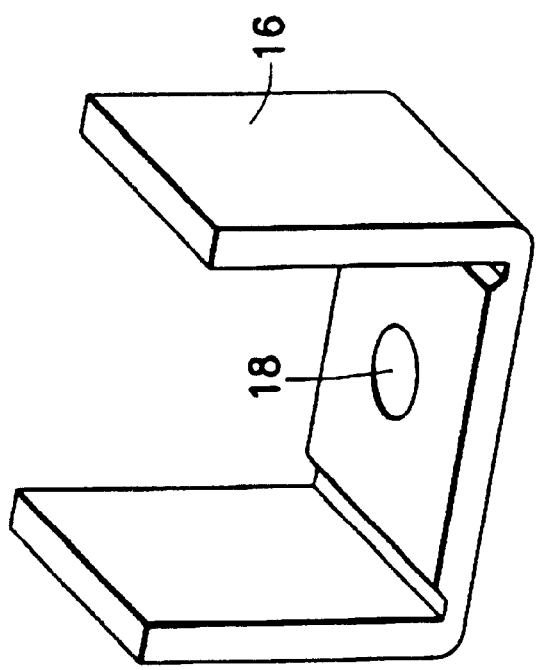
FIG. 5 is a perspective view of a U-shaped saddle.

As may best be seen in FIG. 6, each barb formation 24 presents an inclined upper face 28 and a horizontal under face 29. Those faces meet at a contact line 30. It should also be noted that the barb formation 24 projects substantially further from the tongue 23 than does the stud 25.

The clip 22 further comprises two beads 26 near, but spaced from, the roots of the tongues 23. As may best be seen in FIG. 3, at least the upper margins of the faces of the beads 26 opposed to the tongues 23 are inclined, so that they and the bottom margins of the respectively adjacent tongues define two grooves 27 which are somewhat wider at the top than they are at the bottom. The grooves 27 are dimensioned so that the free end margins of the flanges 13 are a neat fit within the bottom parts of the grooves 27.

Figure 8:
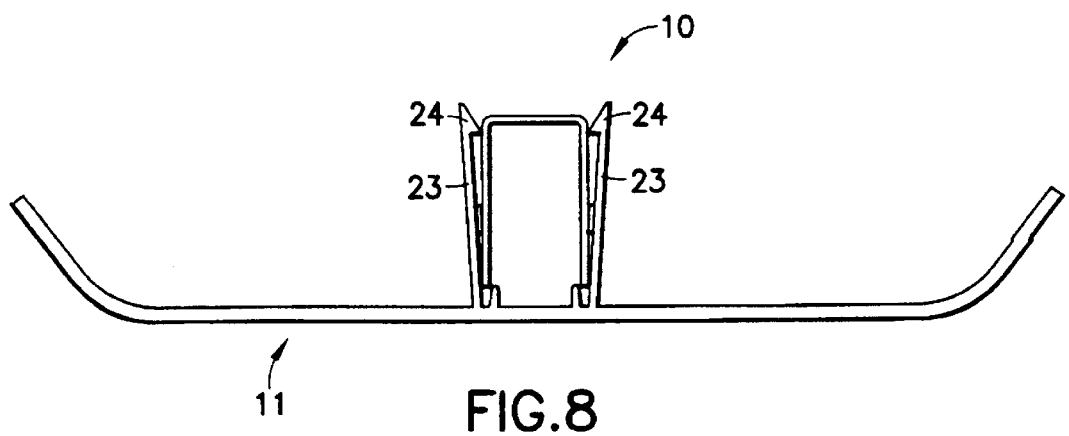
FIG. 8 is a view similar to FIG. 7 at a later stage of the assembly.

By referring particularly to FIGS. 7, 8 and 9, it will be seen that the assembly of a bearer element 11 to the spine 12, at a location corresponding to that of an opposed pair of holes 14, may be achieved simply by pushing the bearer element into position from below. At the start of that assembly operation the inclined faces 28 of the barb formations 24 bear against the free edges of the flanges 13. This assists the operator to guide the flanges 23 into position between the tongues 23. Further upward movement of the bearer element brings the contact lines 30 of the barb formations into pressure contact with the respective outer side faces of the flanges 13. This may cause the free ends of the flanges to move towards each other. More importantly, it causes the tips of the tongues 23 to be resiliently urged apart. As the upward movement of the bearer element continues, the barb formations 24 approach the web 12, so that it becomes progressively more difficult for them to deflect the flanges 13. As a result, the tongues 23 are spread further apart. The extent to which the barb formations 24 project from the tongues beyond that of the studs 25 is such that the studs are held clear of the flanges 13 during the upward movement of the bearer element relative to the spine. When the contact line 30 approaches the web 12, barb formations 24 are no longer able to deflect the flanges 13 to a significant degree, which return substantially to there undeformed position, and their free edge margins may enter the grooves 27 (see FIG. 8). As soon as the barb formations pass beyond the web 12 the tongues 23 spring back to their undeflected position, the studs 25 enter the respective holes 14, the flanges 13 become fully homed in the grooves 27, and the now substantially horizontal underfaces of the barb formations come into overlying contact with the margins of the upper face of the web 12.

Thus, the bearer element 11 becomes very firmly affixed to the spine 10, at least insofar as downward loads on the bearer element are concerned, in that the studs 25 are within the holes 14, the flanges 13 are prevented from moving apart to free the studs 25, by the web 12 at one end and the beads 26 at the other end, and there are no contacting surfaces producing any reaction loading on the tongues tending to separate them.

Figure 10:
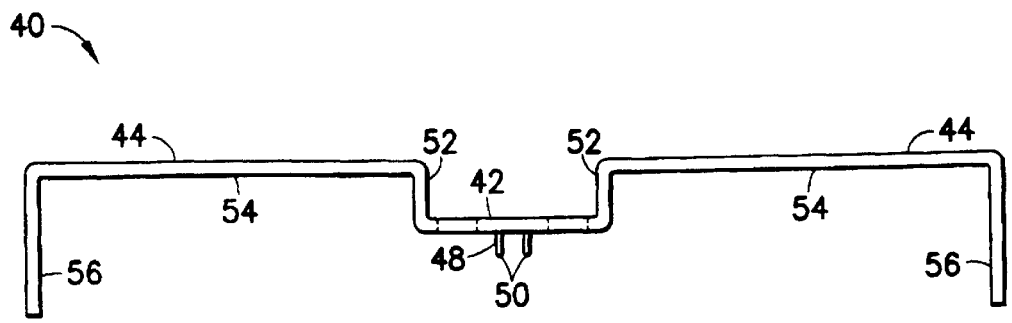
FIG. 10 is a front elevational view of a combined safety clip and closure device incorporating features of the present invention.
Figure 11:
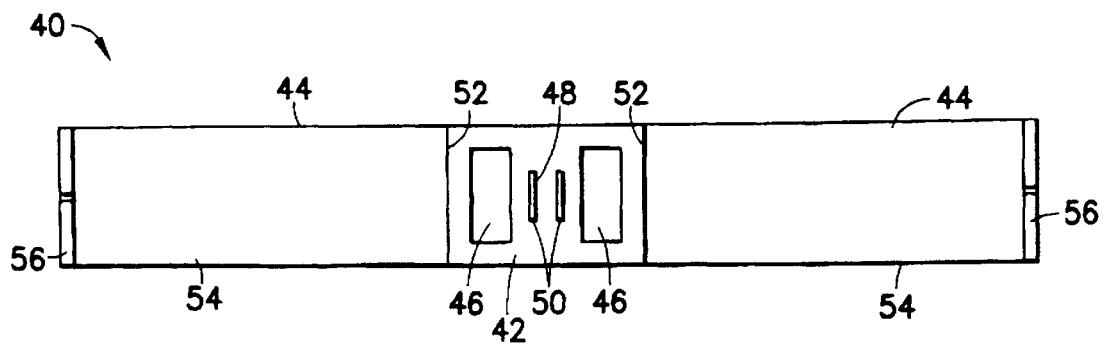
FIG. 11 is a bottom plan view of the combined safety clip and closure device shown in FIG. 10.

Referring now to FIGS. 10 and 11, there is shown a front elevational view and a bottom plan view of a combined safety clip and closure device 40. In the embodiment shown, the device 40 is comprised of a single one-piece member comprised of plastic or polymer material. However, in alternate embodiments, the combined safety clip and closure device could be comprised of more than a single one-piece member and/or could be comprised of any suitable type of material (s). The device 40 generally comprises a first restraining section 42, and two closure sections 44.

The first restraining section 42 generally comprises two apertures 46 therethrough. The apertures 46 are sized and shaped to receive the barb formations 24 of the resilience tongues 23 of a bearer element 11 therein when the bearer element is mounted to the spine 10. The first restraining section 42 also comprises a snap-in mounting section 48. The snap-in mounting section 48 is sized and shaped to be inserted into one of the holes 17 and fixedly attach the device 40 to the spine 10. In the embodiment shown, the snap-in mounting section 48 comprises two deflectable tangs 50. However, in alternate embodiments, any suitable type of snap-in mounting section could be provided.

When the first restraining section 42 is mounted to the spine 10 and the central resilient clip 22, with the barb formations 24 located in the apertures 46, the device 40 prevents the top ends of the resilience tongues 23 from deflecting outward. Thus, the barb formations 24 are retained above the top surface of the channel web 12 and the studs 25 are retained in the holes 14. This prevents the central resilient clip 22 and bearer element 11 from inadvertently disengaging from the spine 10.

The closure sections 44 are substantially identical to each other, but merely orientated in reverse positions on the first restraining section 42. However, in alternate embodiments, the closure sections 44 could be different from each other. In addition, in alternate embodiments, the device 40 could comprise more or less than two closure sections. For example, in one type of alternate embodiment, the combined safety clip and closure device could comprise merely one closure section, such as when the bearer element comprises merely one rung or cantilever arm. In the embodiment shown, each closure section 44 generally comprises a joint 52 with the first restraining section 42, a center section 54, and an outer end section 56.

In the embodiment shown, the joint 52 comprises an upward extension. However, in alternate embodiments, the joint 52 might not extend upward. The joint 52 could be substantially rigid. However, in an alternate embodiment, the joint 52 could comprise a living hinge which allows the center section 54 and outer end section 56 to pivot relative to the first restraining section 42. The length of the center section 54 is about the same size as the length of the cantilever arm of the bearer element. Thus, when the device 40 is connected to the spine 10 and the central resilient clip 22, the outer end sections 56 can be located at the upturned ends of the bearer element.

Figure 2:
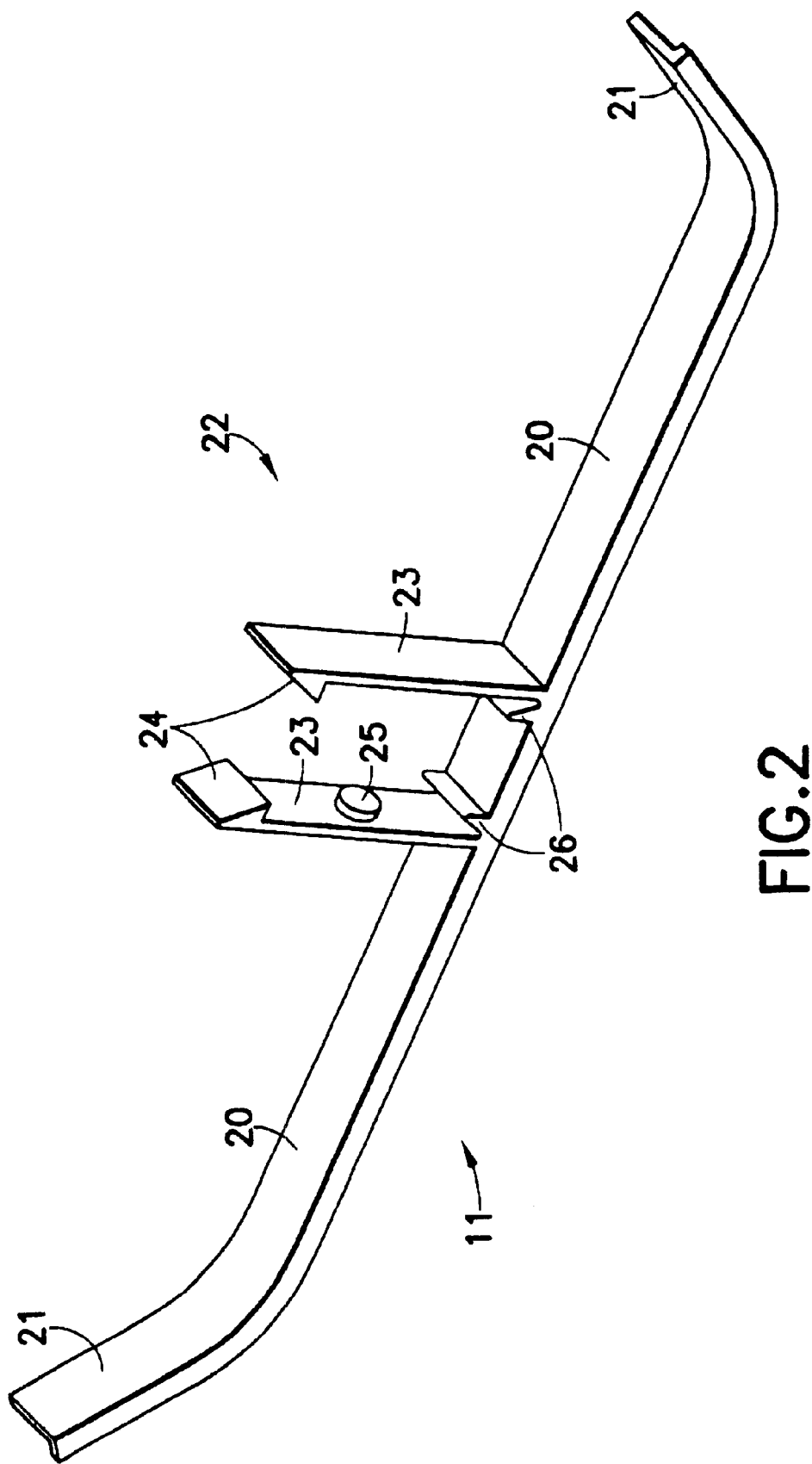
FIG. 2 is a perspective view of a bearer element, being a component of the supporting means of FIG. 1.
Figure 12:
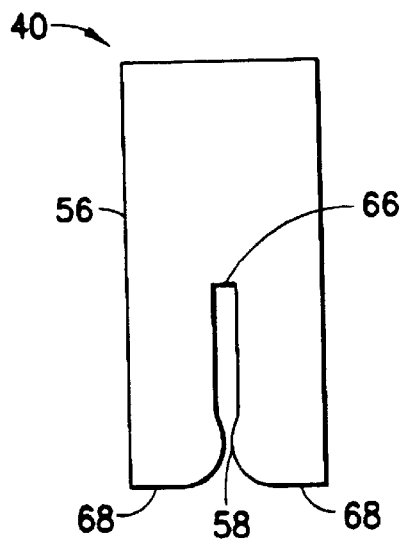
FIG. 12 is a side elevational view of the combined safety clip and closure device shown in FIG. 10.
Figure 13:
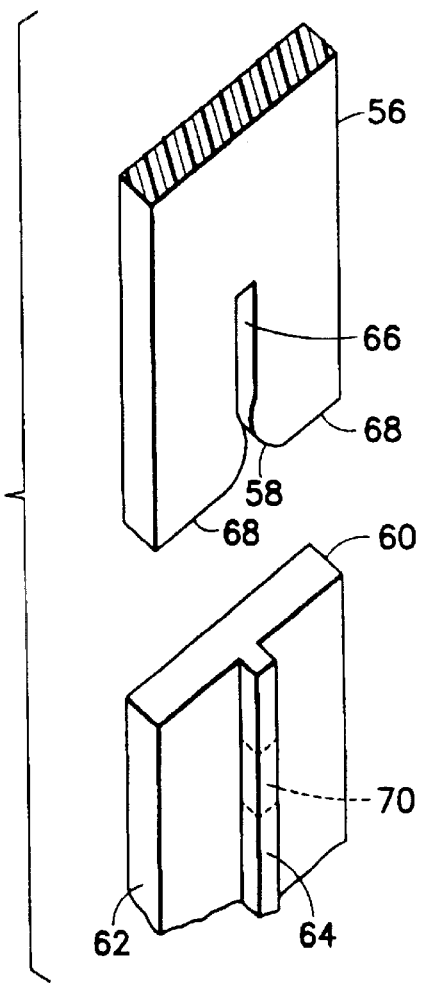
FIG. 13 is a partial exploded perspective view of the outer end of the combined safety clip and closure device shown in FIG. 10 and an outer end of a bearer element.

Referring also to FIGS. 12 and 13, the outer end section 56 of the device 40 comprises a downwardly extending projection with an outer end connector 58. The bearer element 62 shown in FIG. 13 is identical to the bearer element 11 shown in FIGS. 1–3 and 6–9, except for two features; namely, the upturned end 60 is substantially vertically orientated rather than slanted, and the stiffening spine 64 is located centrally on the outer side of the cantilevered arm rather than at the front of the arm as shown in FIG. 2.

The outer end connector 58 comprises a latch which is adapted to stationarily latching the outer end section 56 to the upturned end 60 of the bearer element 62. The connector 58, in the embodiment shown, comprises a receiving slot 66 extending into the bottom of the outer end section 56 between two deflectable tabs 68. The outer end connectors 58 are adapted to be located at the outward sides of the upturned ends 60.

The receiving slot 66 is sized and shaped to receive the end of the stiffening spine 64 therein with the deflectable tabs 68 being outwardly deflected relative to each other in order to accommodate insertion of the stiffening spine 64 into the slot 66. The stiffening spine 64 could comprise a cut-out 70 or detent therein in order to positively locate portions of the deflectable tabs 68 therein. In alternate embodiments, any suitable type of system for latching the outer end sections 56 to the upturned ends 60 of the bearer elements could be provided.

Figure 14:
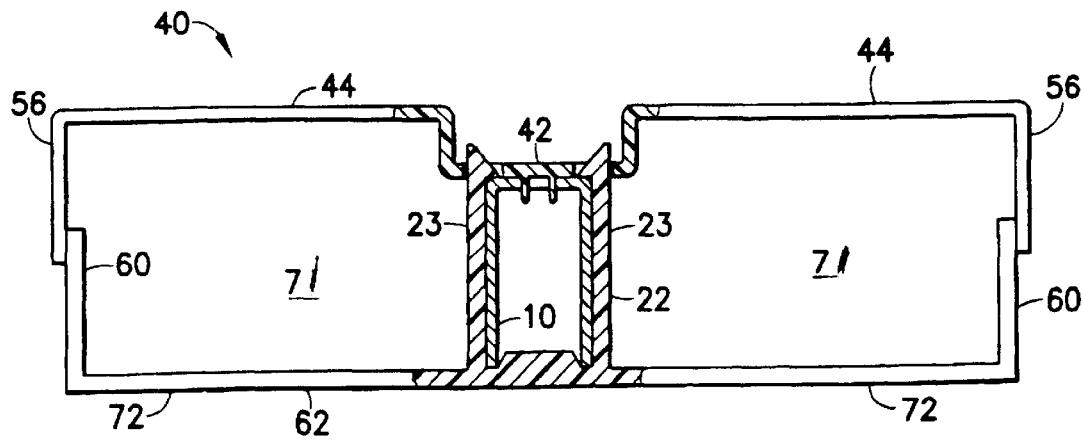
FIG. 14 is a front elevational view with a cutaway section of the combined safety clip and closure device shown in FIG. 10 attached to a spine and bearer element.

Referring also to FIG. 14, a front elevational view with a cutaway section is shown of the combined safety clip and closure device 40 attached to the conductor support or bearer element 62 and the spine 10. The bearer element 62 and device 40 form two conductor receiving areas 71 on opposite sides of the spine 10. The device 40 closes the top entrance into the receiving areas 71. Device 40 also prevents the top ends of the deflectable tongues 23 from moving outward. Thus, the device 40 functions as a safety clip for the deflectable tongues 23 and also functions as a closure for the top side of the receiving areas 71. However, the front and rear sides of the receiving areas 71 are substantially open for the conductors passing therethrough. The device 40 merely prevents the conductors from inadvertently exiting out of the open top sides of the cantilevered arms 72 of the bearer element 62.

In an alternate embodiment, the closure sections 44 might not extend entirely across the width of the cantilevered arms 72. However, in a preferred embodiment, the closure sections extend outward from the first restraining section 42 a majority of the length of the device 40. Additionally, or alternatively, the outer ends of the combined safety clip and closure device might not be physically attached to the outer ends of the bearer element.

The device 40 provides a means of containing conductors laid inside the rungs formed by the cantilevered arms 72 and upturned ends 60. The device 40 can be provided in various different sizes to accommodate different size rungs. The present invention can provide a feature of a covering top clip that can be snapped into the center spine and cover the entire rungs to ensure all cables are contained.

Figure 15:
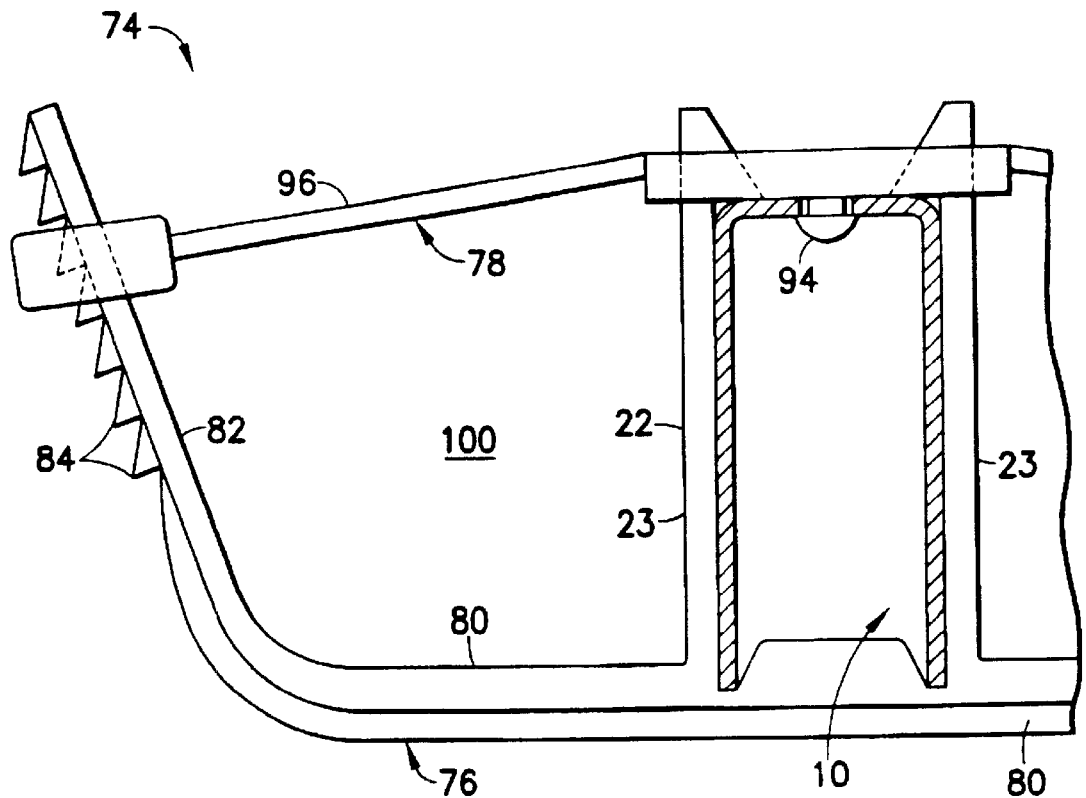
FIG. 15 is a partial front elevational view of an assembly of an alternate embodiment of a bearer element and combined safety clip and closure device incorporating features of the present invention on a spine.
Figure 16:
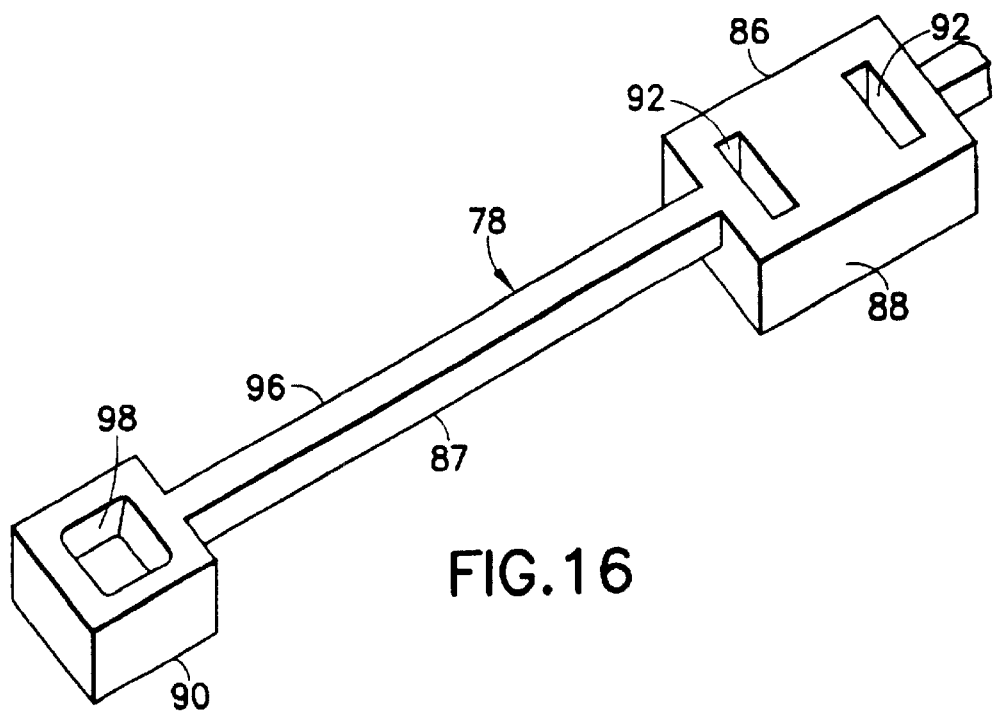
FIG. 16 is a partial perspective view of the combined safety clip and closure device shown in FIG. 15.

Referring now to FIGS. 15 and 16, an alternate embodiment of the present invention will be described. In this embodiment, the conductor support system 74 generally comprises the spine 10, a plurality of the bearer elements 76 (only one of which is shown), and a plurality of combined safety clip and closure devices 78 (only one of which is shown). The bearer element 76 is preferably comprised of molded plastic material and is provided as a one-piece member. However, in alternate embodiments, the bearer element could be comprised of any suitable type of material(s), formed in any suitable way, and could be provided as a multi-piece member.

The bearer element 76 comprises the central resilient clip 22 formed by two resilient tongues 23 and two cantilevered arms 80 which extend outward from opposite sides of the central clip 22. The cantilevered arms 80 each comprise an upturned end 82. In the embodiment shown, the upturned ends 82 each comprise an outer surface with serrated teeth 84.

The device 78 is preferably a one-piece member comprised of molded plastic or polymer material. However, in alternate embodiments, the device 78 could be comprised of any suitable type of material(s), formed in any suitable way, and/or be comprised of more than a single one-piece member. The body of the device 78 comprises a center section 86 and two outwardly extending sections 87. In the embodiment shown, the two outwardly extending sections 87 are substantially mirror images of each other. However, in alternate embodiments, the two outwardly extending sections could be different from each other. In another alternate embodiment, the combined safety clip and closure device could comprise merely one of the outward extending sections.

The device 78 generally comprises a connecting system comprising a main connector 88 and two outer end connectors 90. The main connector 88 is located in the center section 86. The two outer end connectors 90 are located at the outer ends of the outward extending sections 87. The main connector 88, in the embodiment shown, comprises two apertures 92 therethrough and a snap lock connector 94. The apertures 92 are sized and shaped to receive the top ends of the resilience tongues 23 therein. The apertures 92 are sized and shaped to restrain movement of the top ends of the resilience tongues 23 relative to each other. However, in alternate embodiments, the main connector 88 could comprise any suitable type of shape to restrain movement of the top ends of the resilience tongues 23 relative to each other. The snap lock connector 94 is adapted to be snap lock inserted through one of the holes 17 in the spine 10. However, in alternate embodiments, any suitable type of bottom side connector could be provided.

The outward extending sections 87 comprise relatively thin extending arms 96 which connect the outer end connectors 90 to the main connector 88. The relatively thin cross sectional shape of the extending arms 96 allows the extending arms to be relatively flexible. Thus, the extending arms 96 can bend or flex such that the outer end connectors 90 are adapted to move relative to the main connector 88. The outer end connectors 90 each comprise an aperture 98 therethrough. Each aperture is sized and shaped to receive the upturned end 82 of the bearer element 76 therein. More specifically, each aperture 98 is sized and shaped to allow the outer end connector 90 to move along the upturned end 82 with the upturned end sliding through the aperture 98. An interior surface of the outer end connector 90 located in the aperture 98 is adapted to engage the serrated teeth 84 of the upturned end 82 to prevent reverse movement of the outer end connector 90 on the upturned end. Thus, the outer end connector 90 can be adjustably positioned on the upturned end 82, at any suitable height on the upturned end, by a user. This allows a user to adjust the size of the conductor receiving area 100. In alternate embodiments, any suitable type of system for adjustably connecting the outer end of the combined safety clip and closure device to the outer end of the bearer element could be provided.

Figure 17:
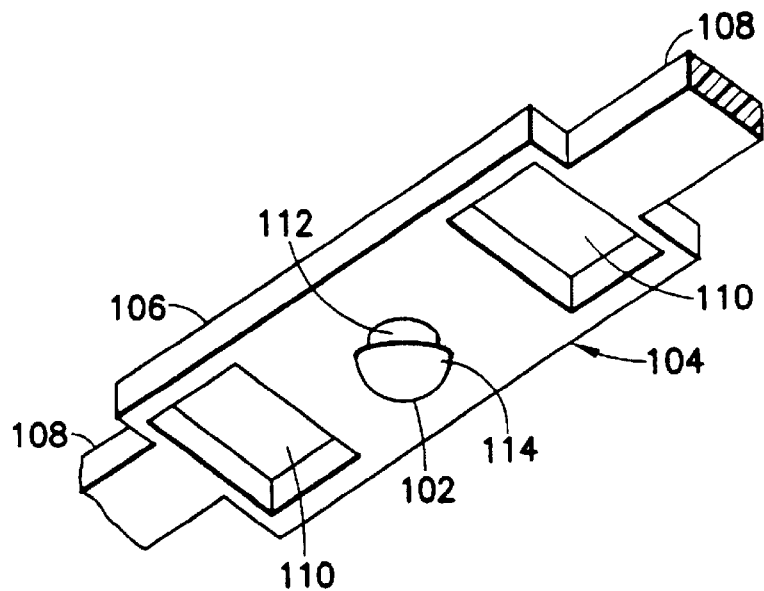
FIG. 17 is a partial perspective view of an alternate embodiment of the combined safety clip and closure device shown in FIG. 15.
Figure 18:
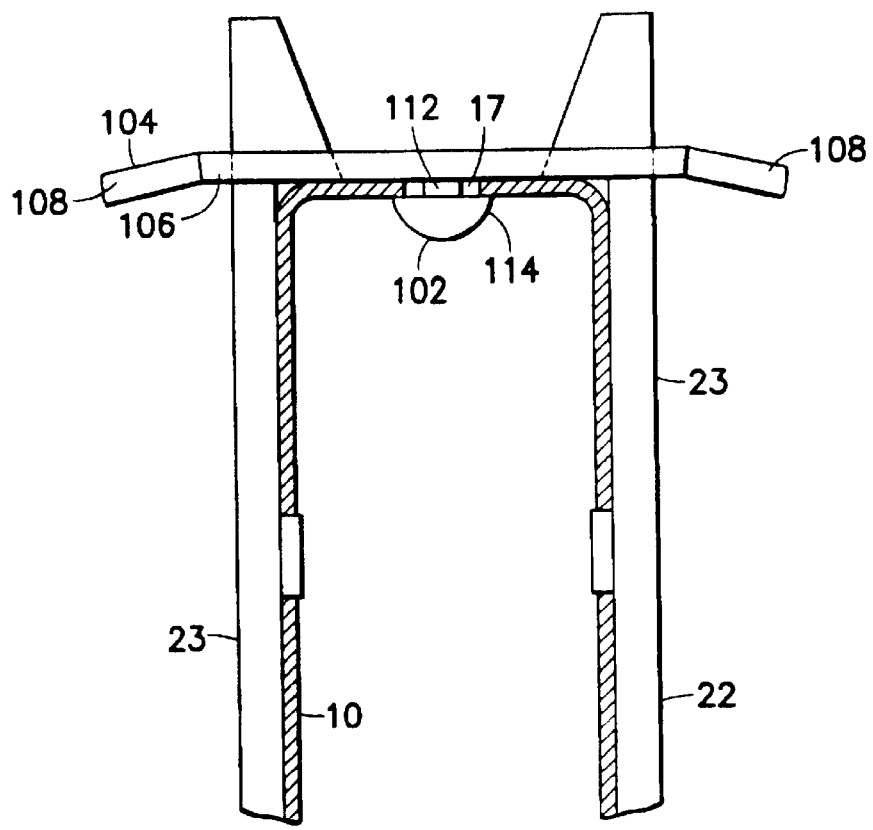
FIG. 18 is a partial front elevational view of an assembly of the combined safety clip and closure device shown in FIG. 17 attached to a spine and bearer element.

Referring now to FIGS. 17 and 18, one type of snap lock connector 102 for a combined safety clip and closure device 104 will be described. The device 104, in the embodiment shown, generally comprises a center section 106 and two outwardly extending sections 108. The two outwardly extending sections 108 each comprise an outer end connector (not shown). The outwardly extending sections 108 and outer end connectors are identical to the outward extending sections 87 and outer end connector is 90 shown in FIGS. 15 and 16. However, in alternate embodiment, any suitable type of outwardly extending sections and outer end connectors could be provided. In an alternate embodiment, the device 104 could comprise more or less than two outwardly extending sections. Additionally, one or more of the outwardly extending sections might not comprise an outer end connector. In another alternate embodiment, the device could be provided as merely a safety clip rather than a combined safety clip and closure device, such as when the device does not comprise any outwardly extending sections but merely comprises the center section 106.

The center section 106 generally comprises the snap lock connector 102 extending from a bottom side thereof, and two apertures 110 therethrough. The apertures 110 are sized and shaped to receive the top ends of the resilient tongues 23 therein. The snap lock connector 102 comprises a general mushroom shape having a dome section 114 and a stem section 112. The stem section 112 is smaller than the hole 17 in the spine 10, but is about the same height as the height of the hole 17. The dome section 114 has an outer perimeter which is slightly larger than the size of the hole 17. The snap lock connector 102 is preferably comprised of molded plastic material which is slightly resilient. The dome section 114 can be inserted through the hole 17 with its outer perimeter resiliently deflecting inward and then outward again after the dome section passes through the hole 17. Thus, the flat top surface of the dome section 114 can be positioned beneath the spine 10 at the hole 17 to snap lock connect the device 104 to the spine 10. In an alternate embodiment, any suitable type of mounting system or snap lock connector, for fixedly connecting the combined safety clip and closure device to the spine 10 could be provided.

Figure 19:
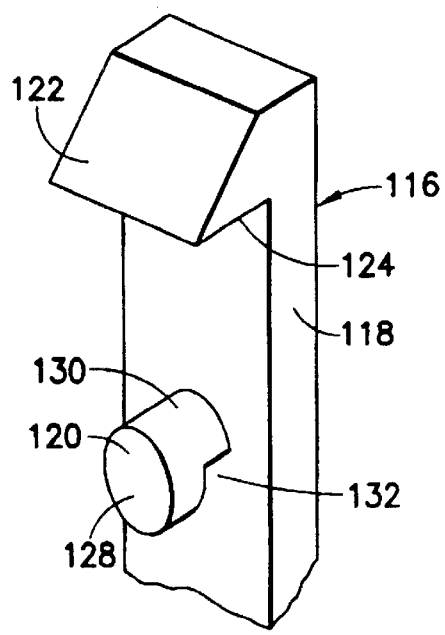
FIG. 19 is a partial perspective view of an alternate embodiment of the resilient tongue used in a central resilient clip of a bearer element.
Figure 20:
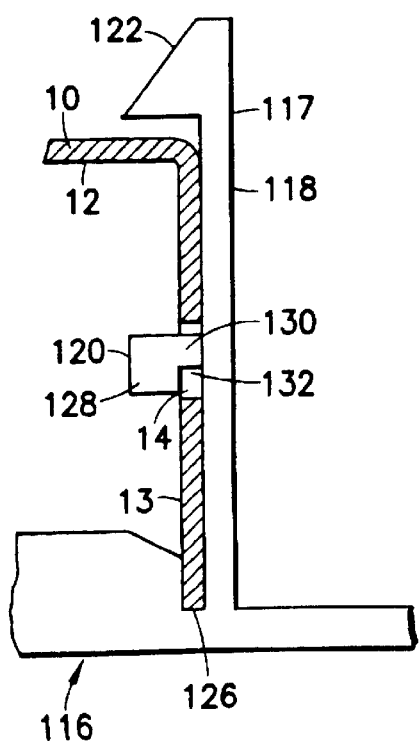
FIG. 20 is a schematic cross sectional view of the resilient tongues shown in FIG. 19 initially attached to a spine.
Figure 21:
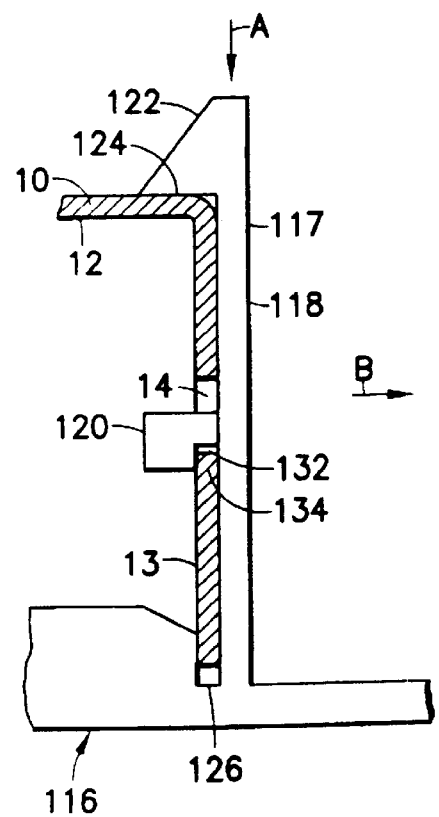
FIG. 21 is a schematic cross sectional view as in FIG. 20 of the resilient tongue attached to the spine in a final mounting position.

Referring now to FIGS. 19–21, an alternate embodiment of the resilient tongue on a bearer element will be described. In this embodiment, a bearer element 116 is provided having a central resilient clip 117 comprising at least one resilient tongue 118 with a locking stud 120. The tongue 118 comprises a top end with a barb formation 122 with a flat bottom contact surface 124. The barb formation 122 forms a snap lock latch for latching with the spine 10. In a preferred embodiment, the bearer element 116 comprises a mirror image resilient tongue opposite to the resilient tongue 118. However, in alternate embodiments, the opposite resilient tongue might not be a mirror image of the resilient tongue 118. The bearer element 116 comprises a slot or groove 126 located at the bottom inside surface of the resilient tongue 118.

The locking stud 120 generally comprises a first section 128 and a second section 130. The first section 128 is sized and shaped to be inserted through the hole 14 in the lateral side of the spine 10. The second section 130 comprises a slot 132 which extends upward from a bottom surface of the stud 120. The slot 132 is sized and shaped to receive a portion of the spine 110, located below the hole 14, therein.

FIG. 20 shows the spine 10 and bearer element 116 when the bearer element is initially mounted onto the spine. The barb formation 122 has snap locked the top surface of the channel web 12 of the spine 10. The locking stud 120 has been positioned through the hole 14 with the first section 128 being located at an interior side of the channel flange 13. The second section 130 of the locking stud 120 and its slot 132 are aligned with the channel flange 113 inside the hole 14. The stud 120 is located in an upper position relative to the hole 14. The bottom of the channel flange 13 is located downward in the groove 126.

As seen with reference also to FIG. 21, the bearer element 116 can be moved downward on the spine 10 as indicated by arrow A. When this occurs, the flat bottom contact surface 124 of the barb formation 122 can come to rest on the top surface of the channel web 12. The bottom end of the channel flange 13 can slide upward in the groove 126. The locking stud 120 can slide downward relative to the hole 14 with a portion 134 of the channel flange 13 being received in the slot 132. Thus, the slot 132 forms a receiving area for receiving a portion of the spine therein. This causes an interlock between the resilient tongue 118 and the spine 10 which prevents the resilient tongue 118 from deflecting outward, as shown by arrow B, unless the bearer element 116 is moved upward relative to the spine 10 in a direction opposite arrow A. However, because of the weight of the bearer element 116, and conductors located on the bearer element, upward movement of the bearer element on the spine will not normally occur. Because the locking stud 120 prevents the resilient tongue 118 from outwardly deflecting when interlocked at the hole 14, the barb formation 122 is prevented from deflecting outward. Thus, the flat bottom contact surface 124 is retained above the top surface of the channel web 12 and thereby prevents the bearer element 116 from disengaging from the spine 10.

This type of direct interlocking engagement between the spine and the bearer element can be used in conjunction with a safety clip or the combined safety clip and closure devices described above or, could be used without any type of safety clip or combined safety clip and closure device. In alternate embodiments, any suitable type of system for directly interlocking the central resilient clip with the spine to prevent the resilient clip from inadvertently or accidentally disengaging from the spine could be provided.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A combined safety clip and closure device for a conductor support, the combined safety clip and closure comprising:
   a first restraining section adapted to be located at, and restrain movement of, at least one spring clip deflectable tongue of the conductor support, the spring clip being mountable to a spine of the conductor support; and
   at least one closure section extending from the first restraining section, the at least one closure section extending outward from the first restraining section a majority of length of the combine safety clip and closure device.

2. A combined safety clip and closure device as in claim 1 wherein the first restraining section comprises an aperture for receiving a top end of the deflectable tongue and a snap-in mounting section for snap lock mounting the combined safety clip and closure in a hole of the spine.

3. A combined safety clip and closure device as in claim 2 wherein the first restraining section comprises a second aperture for receiving a second top end of a second deflectable tongue of the conductor support.

4. A combined safety clip and closure device as in claim 2 wherein the snap-in mounting section comprises a downwardly extending snap lock peg, the snap lock peg comprising a general mushroom shape with a dome section and a stem section, wherein the dome section is suitably sized and shaped to be press fit through the hole in the spine to snap lock mount the safety clip to the spine.

5. A combined safety clip and closure device as in claim 1 wherein the closure section comprises an outer end connector for connecting an outer end of the closure section to an outer end of the conductor support.

6. A combined safety clip and closure device as in claim 5 wherein the outer end connector comprises a latch for stationarily latching onto the outer end of the conductor support.

7. A combined safety clip and closure device as in claim 5 wherein the outer end connector comprises an adjustable connector for adjustably latching onto the outer end of the conductor support at a plurality of different locations.

8. A combined safety clip and closure device as in claim 5 wherein the closure section between the outer end connector and the first restraining section is cross-sectionally thin relative to the outer end connector and the first restraining section.

9. A combined safety clip and closure device as in claim 1 wherein the combined safety clip and closure comprises a one-piece member comprised of plastic material which forms a living hinge located between the first restraining section and the closure section.

10. A combined safety clip and closure device as in claim 1 wherein the at least one closure section comprises two of the closure sections, each closure section extending in an opposite direction relative to each other from the first restraining section.

11. A combined safety clip and closure device as in claim 10 wherein each of the two closure sections comprises an outer end connector for connecting an outer end of each closure section to opposite outer ends of the conductor support.

12. An elongate conductor support system comprising:
   a conductor support comprising a bearer member adapted to be connected to a spine of a support frame, the bearer element comprising a spine mounting section and at least one cantilevered arm extending laterally outward from the spine mounting section, the spine mounting section comprising a spring clip deflectable tongue; and
   a combined safety clip and closure device as in claim 1 adapted to be connected to the bearer member.

13. An elongate conductor support system as in claim 12 wherein the spine mounting section comprises an inwardly extending stud located on the spring clip deflectable tongue, the stud having a slot extending upward into the stud to form a receiving area for receiving a portion of the spine therein.

14. A closure device for closing an entrance into a conductor bearer element for an elongate conductor, the closure device comprising:
   a center section; and
   a connecting system comprising a main connector and at least one outer end connector with at least a portion of the center section being located therebetween,
   wherein the main connector is adapted to connect to a spine mount of the bearer element, and wherein the outer end connector is adapted to adjustably connect to an outer end of a cantilevered arm of the bearer element.

15. A closure device as in claim 14 wherein the main connector comprises at least one aperture for receiving a top end of at least one deflectable tongue of the spine mount, and a snap-in mounting section for snap lock mounting the closure device in a hole of the spine.

16. A closure device as in claim 15 wherein the snap-in mounting section comprises a downwardly extending snap lock peg, the snap lock peg comprising a general mushroom shape with a dome section and a stem section, wherein the dome section is suitably sized and shaped to be press fit through the hole in the spine to snap lock mount the safety clip to the spine.

17. A closure device as in claim 14 wherein the outer end connector comprises a pass-through hole therein adapted to allow the outer end connector to slide along the outer end of the cantilevered arm with the outer end of the cantilevered arm passing through the pass-through hole.

18. A closure device as in claim 17 wherein the center section is deflectable to provide a movable connection between the main connector and the outer end connector.

19. An elongate conductor support system comprising:
   a conductor support comprising a bearer member adapted to be connected to a spine of a support frame, the bearer element comprising a spine mount and at least one cantilevered arm extending laterally outward from the spine mount, the spine mount comprising a spring clip deflectable tongue; and
   a closure device as in claim 14 having the main connector attached to the spring clip deflectable tongue and the outer end connector connected to an upwardly extending end of the cantilevered arm.

20. An elongate conductor support system as in claim 19 wherein the upwardly extending end of the cantilevered arm comprises a section having serrated teeth for adjustably connected with the outer end connector.

21. A method of connecting an elongate conductor bearer element to a spine in an elongate conductor support system comprising steps of:
   connecting a main connection section of the bearer element to the spine; and
   connecting a closure device to the bearer element comprising:
      mounting a safety clip section of the closure device at top ends of tongues of the main connection section, and
      covering a majority of a length of a top side opening into a conductor receiving area of the bearer element by a portion of the closure device.

* * * * *